(12) United States Patent
Horie et al.

(10) Patent No.: US 8,330,805 B2
(45) Date of Patent: *Dec. 11, 2012

(54) STEREOSCOPIC IMAGE DISPLAY APPARATUS AND METHOD OF MANUFACTURING THE SAME

(75) Inventors: Osamu Horie, Kanagawa (JP); Masamichi Okada, Kanagawa (JP); Hideo Niyomura, Gifu (JP); Hiroshi Ohno, Tokyo (JP); Takayuki Kobayashi, Tokyo (JP); Joji Karasawa, Kanagawa (JP); Atsushi Sakata, Kanagawa (JP); Hiromichi Abe, Kanagawa (JP)

(73) Assignee: Sony Corporation (JP)

( * ) Notice: Subject to any disclaimer, the term of this patent is extended or adjusted under 35 U.S.C. 154(b) by 793 days.

This patent is subject to a terminal disclaimer.

(21) Appl. No.: 12/460,827

(22) Filed: Jul. 24, 2009

(65) Prior Publication Data

US 2010/0033558 A1     Feb. 11, 2010

(30) Foreign Application Priority Data

Jul. 28, 2008   (JP) ............................ P2008-193100

(51) Int. Cl.
  *H04N 13/04*   (2006.01)
(52) U.S. Cl. ........................................ 348/51; 348/54
(58) Field of Classification Search ............ 348/51–60
  See application file for complete search history.

(56) References Cited

U.S. PATENT DOCUMENTS

| | | | | |
|---|---|---|---|---|
| 4,269,924 A | * | 5/1981 | Janssens et al. | 430/214 |
| 4,273,863 A | * | 6/1981 | Deabriges et al. | 430/467 |
| 4,353,975 A | * | 10/1982 | Janssens et al. | 430/239 |
| 4,359,517 A | * | 11/1982 | Bourgeois | 430/213 |
| 4,492,177 A | * | 1/1985 | Vackier et al. | 399/166 |
| 4,515,461 A | * | 5/1985 | Vackier | 399/166 |
| 4,839,692 A | * | 6/1989 | Shoji et al. | 399/178 |
| 4,911,543 A | * | 3/1990 | Hodgson | 359/369 |
| 4,923,848 A | * | 5/1990 | Akada et al. | 503/227 |

(Continued)

FOREIGN PATENT DOCUMENTS

JP     08050290 A     2/1996

(Continued)

OTHER PUBLICATIONS

Office Action from Japanese Application No. 2008-193101, dated May 11, 2010.

(Continued)

*Primary Examiner* — Hieu Hoang
(74) *Attorney, Agent, or Firm* — Lerner, David, Littenberg, Krumholz & Mentlik, LLP

(57) ABSTRACT

A stereoscopic image display apparatus includes an image display panel displaying an image for a right eye and an image for a left eye in a regularly mixed manner in a plane, a phase difference element including a right-eye image display portion corresponding to the image for the right eye and a left-eye image display portion corresponding to the image for the left eye to provide different polarization states, a light shield layer formed to project only in an area including a boundary between the right-eye image display portion and the left-eye image display portion of the phase difference element, and a binder layer interposed between the phase difference element and the image display panel, except for a portion between a top surface of the light shield layer and the image display panel, thus bonding the image display panel, the phase difference element, and the light shield layer together.

10 Claims, 7 Drawing Sheets

U.S. PATENT DOCUMENTS

| | | | |
|---|---|---|---|
| 5,001,576 A * | 3/1991 | Tanaka et al. | 358/462 |
| 5,235,437 A * | 8/1993 | Katagiri et al. | 358/471 |
| 5,236,780 A * | 8/1993 | Yamane et al. | 428/402.2 |
| 5,267,030 A * | 11/1993 | Giorgianni et al. | 358/527 |
| 5,298,308 A * | 3/1994 | Yamane et al. | 428/32.51 |
| 5,322,832 A * | 6/1994 | Takeyama et al. | 503/227 |
| 5,327,263 A * | 7/1994 | Katagiri et al. | 358/471 |
| 5,379,127 A * | 1/1995 | Ando | 358/448 |
| 5,394,875 A * | 3/1995 | Lewis et al. | 600/445 |
| 5,408,300 A * | 4/1995 | Wataki et al. | 399/313 |
| 5,420,979 A * | 5/1995 | Madden et al. | 345/501 |
| 5,442,464 A * | 8/1995 | Ito | 358/482 |
| 5,445,910 A * | 8/1995 | Ishikawa et al. | 430/108.11 |
| 5,451,560 A * | 9/1995 | Akada et al. | 503/227 |
| 5,452,111 A * | 9/1995 | Giorgianni et al. | 358/504 |
| 5,571,656 A * | 11/1996 | Kingsley et al. | 430/218 |
| 5,616,445 A * | 4/1997 | Kelley et al. | 430/204 |
| 5,629,259 A * | 5/1997 | Akada et al. | 503/227 |
| 5,649,267 A * | 7/1997 | Aerens et al. | 399/159 |
| 5,672,223 A * | 9/1997 | Kimura et al. | 156/234 |
| 5,673,077 A * | 9/1997 | Kawakami et al. | 347/183 |
| 5,689,758 A * | 11/1997 | Wataki et al. | 399/45 |
| 5,707,925 A * | 1/1998 | Akada et al. | 503/227 |
| 5,726,770 A * | 3/1998 | Harada | 358/444 |
| 5,736,286 A * | 4/1998 | Kaneko et al. | 430/124.15 |
| 5,767,860 A * | 6/1998 | Zimmer et al. | 345/441 |
| 5,790,183 A * | 8/1998 | Kerbyson | 348/37 |
| 5,841,521 A * | 11/1998 | Kelley et al. | 355/67 |
| 5,851,717 A * | 12/1998 | Tsubuko et al. | 430/108.21 |
| 5,886,818 A * | 3/1999 | Summer et al. | 359/478 |
| 5,940,111 A * | 8/1999 | Akada et al. | 347/213 |
| 5,956,044 A * | 9/1999 | Giorgianni et al. | 345/590 |
| 5,965,485 A * | 10/1999 | Mizumachi et al. | 503/227 |
| 5,987,223 A * | 11/1999 | Narukawa et al. | 358/1.9 |
| 6,046,849 A | 4/2000 | Moseley et al. | |
| 6,052,484 A * | 4/2000 | Kobayashi | 382/195 |
| 6,064,847 A * | 5/2000 | Iwamatsu et al. | 399/283 |
| 6,069,681 A * | 5/2000 | Nakagawa et al. | 355/23 |
| 6,069,716 A * | 5/2000 | Yamamoto | 358/518 |
| 6,096,473 A * | 8/2000 | Kelley et al. | 430/204 |
| 6,101,291 A * | 8/2000 | Arney et al. | 382/293 |
| 6,160,527 A | 12/2000 | Morishima et al. | |
| 6,202,073 B1 * | 3/2001 | Takahashi | 715/204 |
| 6,437,915 B2 | 8/2002 | Moseley et al. | |
| 6,963,356 B2 | 11/2005 | Satoh | |
| 6,982,178 B2 | 1/2006 | LeCain et al. | |
| 7,414,782 B2 | 8/2008 | Jung | |
| 7,554,712 B2 | 6/2009 | Patry et al. | |
| 7,697,204 B2 | 4/2010 | Sugiyama | |
| 7,813,042 B2 | 10/2010 | Mather et al. | |
| 2002/0071179 A1 | 6/2002 | Maeda et al. | |
| 2002/0180663 A1 | 12/2002 | Maeda et al. | |
| 2002/0191073 A1 | 12/2002 | Satoh | |
| 2009/0040401 A1 | 2/2009 | Tamura et al. | |
| 2010/0026793 A1 | 2/2010 | Sakata et al. | |
| 2010/0033558 A1 | 2/2010 | Horie et al. | |
| 2010/0067254 A1 | 3/2010 | Ohta et al. | |
| 2010/0182686 A1 | 7/2010 | Fukushima et al. | |

FOREIGN PATENT DOCUMENTS

| | | |
|---|---|---|
| JP | 08179251 A | 7/1996 |
| JP | 09227841 A | 9/1997 |
| JP | 10221643 A | 8/1998 |
| JP | 10227998 A | 8/1998 |
| JP | 2001-059948 A | 3/2001 |
| JP | 2001-075048 A | 3/2001 |
| JP | 2002-185983 A | 6/2002 |
| JP | 2002-196281 A | 7/2002 |
| JP | 2004133222 A | 4/2004 |
| JP | 2004276579 A | 10/2004 |
| JP | 2005164668 A | 6/2005 |
| JP | 2006119369 A | 5/2006 |
| JP | 2006145653 A | 6/2006 |
| JP | 2006178335 A | 7/2006 |
| JP | 2007171521 A | 7/2007 |
| JP | 2007225972 A | 9/2007 |
| JP | 2008145866 A | 6/2008 |
| JP | 2008151996 A | 7/2008 |
| JP | 2008-193102 A | 8/2008 |
| JP | 2008-285021 A | 11/2008 |
| JP | 2008-285022 A | 11/2008 |
| JP | 2009-105887 A | 5/2009 |
| JP | 2009109968 A | 5/2009 |
| WO | 2006080530 A1 | 8/2006 |
| WO | 2008029891 A1 | 3/2008 |

OTHER PUBLICATIONS

Office Action from Japanese Application No. 2008-193099, dated Oct. 5, 2010.

Office Action from Japanese Application No. 2008-193098, dated May 11, 2010.

* cited by examiner

Y-hat CONTOUR GRAPH: ROLLER PRESSING VS SPEED
CONSTANT: CLEARANCE = 0.4

STEREOSCOPIC IMAGE DISPLAY APPARATUS AND METHOD OF MANUFACTURING THE SAME

CROSS-REFERENCE TO RELATED APPLICATION

The present application claims priority from Japanese Patent Application No. JP 2008-193100 filed in the Japanese Patent Office on Jul. 28, 2008, the entire content of which is incorporated herein by reference.

BACKGROUND OF THE INVENTION

1. Field of the Invention

The present invention relates to a stereoscopic image display apparatus for displaying a stereoscopic image by utilizing an image for a right eye and an image for a left eye, and also relates to a method of manufacturing the stereoscopic image display apparatus.

2. Description of the Related Art

Hitherto, a stereoscopic image display apparatus for displaying a stereoscopic image has been proposed, for example, which is constructed as illustrated in FIG. 6 (see, e.g., Japanese Unexamined Patent Application Publication No. 2002-196281). The stereoscopic image display apparatus, illustrated in FIG. 6, includes an image display panel 51 made of a liquid crystal panel, for example, and a phase difference element 52 disposed on an image output surface side of the image display panel 51. A viewing person looks at display outputs provided by the stereoscopic image display apparatus by using a pair of polarization spectacles 53. In more detail, the image display panel 51 displays an image R for a right eye and an image L for a left eye in a regularly mixed manner in a plane, for example, such that the image R for the right eye and the image L for the left eye are alternately displayed per horizontal line. The phase difference element 52 has a right-eye image display portion 52R corresponding to the image R for the right eye and a left-eye image display portion 52L corresponding to the image L for the left eye. The right-eye image display portion 52R and the left-eye image display portion 52L are alternately arranged per horizontal line. Further, the right-eye image display portion 52R and the left-eye image display portion 52L realize different polarization states, for example, such that the right-eye image display portion 52R provides unidirectional linearly-polarized light (e.g., in a direction climbing to the right), while the left-eye image display portion 52L provides linearly-polarized light (e.g., in a direction climbing to the left) which is rotated through 90° to be perpendicular to the former linearly-polarized light. In combination with the image display panel 51 and the phase difference element 52, the viewing person puts on the polarization spectacles 53 of which right- and left-eye spectacles have different angles of polarization adapted for the corresponding images. Accordingly, the image R for the right eye and the image L for the left eye enter the right eye and the left eye of the viewing person independently of each other. Stated another way, through the right-eye spectacle 53R having the angle of polarization which corresponds to the rightwards climbing direction, the viewing person can see only the image R for the right eye in each odd line, which matches in the angle of polarization with the right-eye spectacle 53R, but is not able to see the image L for the left eye in each even line, which has the angle of polarization rotated through 90° to the leftwards climbing direction by the left-eye image display portion 52L of the phase difference element 52. On the other hand, through the left-eye spectacle 53L having the angle of polarization which corresponds to the leftwards climbing direction, the viewing person can see only the image L for the left eye in each even line, which matches in the angle of polarization with the left-eye spectacle 53L, but is not able to see the image R for the right eye in each odd line, which has the angle of polarization rotated through 90° to the rightwards climbing direction by the right-eye image display portion 52R of the phase difference element 52. Stereoscopic image display apparatuses having other constructions than that described above are also proposed in which left and right images are separately displayed and combined to a stereoscopic image by using polarization spectacles.

In those stereoscopic image display apparatuses, the so-called crosstalk phenomenon may occur. The term "crosstalk phenomenon" implies such a disadvantageous phenomenon that, when the viewing person looks at the image display panel, for example, in an oblique direction not from the front, the image R for the right eye passes through the left-eye image display portion 52L and the image L for the left eye passes through the right-eye image display portion 52R, whereby an image looked at by the viewing person becomes unclear and a stereoscopic effect is reduced.

To prevent the crosstalk phenomenon, a stereoscopic image display apparatus is proposed in which a light shield layer for shielding the light is disposed at the boundary between the right-eye image display portion 52R and the left-eye image display portion 52L of the phase difference element 52 (see, e.g., Japanese Unexamined Patent Application Publication No. 2002-185983). In more detail, for example, when the right-eye image display portion 52R and the left-eye image display portion 52L are alternately arranged per horizontal line, a stripe-shaped light shield layer is arranged to position only in an area with a predetermined width, which includes the boundary between both the display portions 52R and 52L. The light shield layer can be formed, for example, by arranging a black material having a function of shielding the light so as to project on the surface of the phase difference element 52. With the provision of the light shield layer, even when the viewing person looks at the image display panel in an oblique direction, for example, the light is shielded by the light shield layer in such a manner that the image R for the right eye does not pass through the left-eye image display portion 52L and the image L for the left eye does not pass through the right-eye image display portion 52R. Thus, the generation of the crosstalk phenomenon can be prevented.

When the stereoscopic image display apparatus enabling a stereoscopic image to be viewed through the polarization spectacles 53 is constructed, the phase difference element 52 is necessitated to be fixedly arranged on the image output surface side of the image display panel 51. Hitherto, the phase difference element 52 has been fixedly arranged by overlaying the phase difference element 52 on the image display panel 51 with, e.g., magnets interposed therebetween, or by bonding the phase difference element 52 to the image display panel 51 with a suitable bond (see, e.g., Japanese Patent Laid-Open No. 2001-59948 and No. 2001-75048). In one concrete example, the phase difference element 52 can be fixedly arranged by tentatively fixing the phase difference element 52 at its outer peripheral portion with, e.g., magnets or tapes, and then bonding it to the image display panel 51 at four or eight points along the outer peripheral portion of the phase difference element 52 with, e.g., a bond or an ultraviolet curing resin.

SUMMARY OF THE INVENTION

However, when the image display panel 51 and the phase difference element 52 are fixed to each other only at the outer peripheral portion, there is a risk that sufficient adhesion is not provided near a central portion of a display area, or that the distance between the image display panel 51 and the phase difference element 52 becomes uneven. Such a problem regarding the insufficient adhesion or the uneven distance, for example, is to be avoided because the problem may generate, e.g., the Moiré phenomenon or the Newton rings (interference fringes), and may cause deterioration in quality of a displayed image.

For that reason, it is conceivable to construct the stereoscopic image display apparatus by the so-called full-surface bonding, i.e., by bonding the image display panel 51 and the phase difference element 52 to each other with a binder interposed over an entire surface area between them. Herein, the term "binder" implies a material interposed between two members for bonding, specifically a bond or an adhesive material.

In the stereoscopic image display apparatus including the light shield layer formed in the projected shape to prevent the generation of the crosstalk phenomenon, however, consideration is to be paid to influences of projections and recesses which are formed on the surface of the phase difference element 52 by the light shield layers.

For example, when the image display panel 51 and the phase difference element 52 are bonded to each other by the full-surface bonding with the binder interposed over the entire surface area therebetween, there is a possibility that the binder may not spread into every corners due to the influences of the projections and the recesses formed by the light shield layers. An air layer generated as a result of the binder not spreading into every corners may impair uniformity or reduce contrast of the displayed image, for example, due to the light refractive action at the air layer, thus causing deterioration in quality of the displayed image.

Such deterioration in quality of the displayed image can be avoided by selecting specifications of the binder, bonding conditions, etc. such that the binder is fully filled into even the depressions, i.e., into even areas where the light shield layers are not present, to thereby prevent generation of the air layer. However, a method of just causing the binder to follow the projections and the recesses formed by the light shield layers accompanies a risk that a distribution state of bonding stresses (reaction forces) between the image display panel 51 and the phase difference element 52 may become uneven due to, e.g., difference in thickness of the binder between an area where the light shield layer is present and an area where the light shield layer is not present, or difference in a partial undulating state on the surface of the phase difference element 52, including the light shield layers. Such unevenness of the stress in-plane distribution state may cause, e.g., a variation in brightness and non-uniform contrast of the displayed image.

Stated another way, when the phase difference element 52 is bonded to the image display panel 51 on condition that the projections and the recesses formed by the light shield layers are present on the surface of the phase difference element 52, it is necessary to suppress deterioration in image quality caused by the unevenness of the stress in-plane distribution state while suppressing deterioration in image quality caused by the light refractive action at the air layer.

Accordingly, it is desirable to provide a stereoscopic image display apparatus which can properly bond a phase difference element to an image display panel even when there are projections and depressions formed by light shield layers, and to provide a method of manufacturing the stereoscopic image display apparatus.

According to an embodiment of the present invention, a stereoscopic image display apparatus includes an image display panel displaying an image for a right eye and an image for a left eye in a regularly mixed manner in a plane, a phase difference element including a right-eye image display portion corresponding to the image for the right eye and a left-eye image display portion corresponding to the image for the left eye, the right-eye image display portion and the left-eye image display portion bringing about polarization such that the image for the right eye and the image for the left eye have different polarization states, a light shield layer formed only in an area including a boundary between the right-eye image display portion and the left-eye image display portion of the phase difference element, the light shield layer projecting from a surface of the phase difference element toward the image display panel, and a binder layer interposed between the surface of the phase difference element on which the light shield layer is formed and the image display panel, except for a portion between a top surface of the light shield layer and the image display panel, thus bonding the image display panel, the phase difference element, and the light shield layer together.

In the stereoscopic image display apparatus thus constructed, the binder layer is interposed between the surface of the phase difference element on which the light shield layer is formed and the image display panel, except for the portion between the top surface of the light shield layer and the image display panel, whereby the image display panel, the phase difference element, and the light shield layer are bonded together.

More specifically, even with projections and recesses formed on the surface of the phase difference element by the light shield layers, the recesses where the light shield layers are not formed, i.e., light transmissive areas, are each filled with the binder layer in a way following the shape of the recess. Therefore, an air layer causing deterioration in quality of a displayed image is prevented from being generated in spite of the light shield layers providing the projections and the recesses.

On the other hand, a space not filled with the binder layer is present between the top surface of the light shield layer and the image display panel. Accordingly, that space acts to escape distortions that may occur during the bonding. As a result, unevenness of the bonding-stress in-plane distribution state after the bonding is reduced. Further, the position at which the above-mentioned space is present corresponds to a position between the top surface of the light shield layer and the image display panel, i.e., a position at which light is blocked by the light shield layer. Therefore, the presence of the space does not deteriorate the quality of the displayed image unlike the case that such a space (air layer) is present in the recess where the light shield layer is not formed.

The term "binder layer" implies a layer formed of a binder. Hence, the "binder layer" implies, for example, a layer formed of an adhesive material in this specification, but it also includes a layer formed of a bond.

With the embodiment of the present invention, since the surface of the phase difference element, on which the light shield layer is formed, and the image display panel are bonded to each other with the binder layer interposed therebetween except for the portion between the top surface of the light shield layer and the image display panel, the binder layer effectuates the bonding over a region of the image display panel including the image display area. Therefore, generation of, e.g., the Moiré phenomenon or the Newton rings (interference fringes), which may cause deterioration in quality of the displayed image, can be avoided substantially as in the case where the image display panel and the phase difference element are bonded to each other by the full-surface bonding.

Moreover, even when the surface of the phase difference element includes the projections and the recesses formed by the light shield layers, an air layer is not formed in the recesses where the light shield layers are not present, and deterioration in quality of the displayed image can be avoided which is attributable to the light refractive action by the air layer. In addition, the space not filled with the binder layer is present between the top surface of the light shield layer and the image display panel, the unevenness of the bonding-stress in-plane distribution state is reduced and deterioration in quality of the displayed image attributable to the unevenness of the stress in-plane distribution state can also be suppressed.

Thus, in constructing the stereoscopic image display apparatus according to the embodiment of the present invention, even when the surface of the phase difference element includes the projections and the recesses formed by the light shield layers, the deterioration in image quality, which is attributable to the unevenness of the stress in-plane distribution state can be suppressed while suppressing the deterioration in image quality, which is attributable to the light refractive action by the presence of the air layer. As a result, the phase difference element and the light shield layer can be properly bonded to the image display panel.

DESCRIPTION OF THE PREFERRED EMBODIMENTS

A stereoscopic image display apparatus and a method of manufacturing the stereoscopic image display apparatus, according to an embodiment of the present invention, will be described below with reference to the drawings.

[Basic Construction of Stereoscopic Image Display Apparatus]

A basic construction of the stereoscopic image display apparatus is first described.

Figure 1:
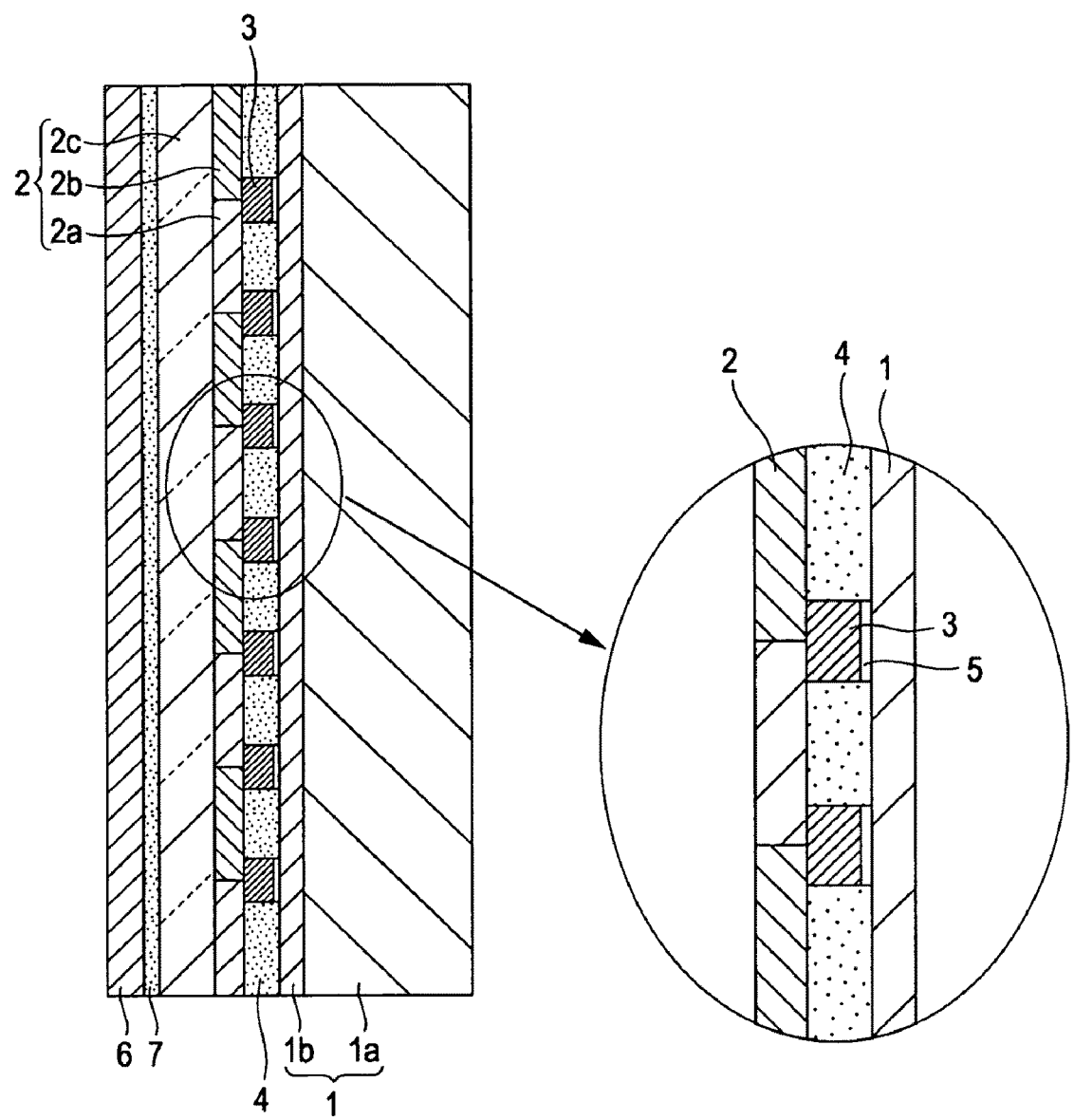
FIG. 1 is an explanatory view illustrating an example of construction, in a simplified form, of a stereoscopic image display apparatus according to an embodiment of the present invention.

FIG. 1 is an explanatory view illustrating an example of construction, in a simplified form, of the stereoscopic image display apparatus according to the embodiment of the present invention.

The stereoscopic image display apparatus, illustrated in FIG. 1, includes an image display panel 1, a phase difference element 2, a light shield layer 3, a binder layer 4, an air layer 5, an antireflective film 6, and a binder layer 7.

The image display panel 1 includes at least a liquid crystal panel 1a and a polarizing plate 1b arranged on an image output surface side of the liquid crystal panel 1a. The image display panel 1 displays an image for a right eye and an image for a left eye in a regularly mixed manner in a plane, for example, such that the image for the right eye and the image for the left eye are alternately displayed per horizontal line. So long as the image for the right eye and the image for the left eye are formed in a regularly mixed manner in a plane, the image display panel 1 can also be practiced in other suitable mixed display modes instead of the alternate display per horizontal line.

In the image display panel 1 thus constructed, when the liquid crystal panel 1a is of the transmissive type, for example, another polarizing plate in a crossed Nichol relation to the polarizing plate 1b, a backlight serving as a light source, etc. (not shown) are arranged on the side opposite to the polarizing plate 1b with the liquid crystal panel 1a interposed therebetween. The image display panel 1 is not necessarily constructed by using the liquid crystal panel 1a, and it may be constructed by using other suitable types of display device, e.g., an organic EL (Electro Luminescence) display panel.

The phase difference element 2 has a right-eye image display portion 2a corresponding to the image for the right eye and a left-eye image display portion 2b corresponding to the image for the left eye. The phase difference element 2 is arranged on an image output surface side of the image display panel 1 such that the right-eye image display portion 2a and the left-eye image display portion 2b are formed in a regularly mixed manner in a plane (e.g., alternately per horizontal line) similarly to the image for the right eye and the image for the left eye in the image display panel 1. Herein, the expression "image output surface side" implies a panel surface side from which an image is output to be displayed. Concretely, it implies a surface side of the image display panel 1 which is positioned to face a viewing person who looks at the displayed image. In more detail, the phase difference element 2 includes a support base 2c made of a glass material or a film having no birefringence, and a phase difference layer formed on the support base 2c. The phase difference layer has a portion providing a polarization state corresponding to the image for the right eye and a portion providing a polarization state corresponding to the image for the left eye. Thus, the phase difference element 2 realizes the functions of the right-eye image display portion 2a and the left-eye image display portion 2b. In other words, the phase difference element 2 provides different polarization states in the right-eye image display portion 2a and the left-eye image display portion 2b.

Concretely, respective polarization directions of the right-eye image display portion 2a and the left-eye image display portion 2b are, for example, perpendicular to each other. The right-eye image display portion 2a and the left-eye image display portion 2b are alternately formed on the support base 2c having a thickness of about 0.7 mm in match with a vertical pitch of the horizontal lines in the image display panel 1. As another example, the image display panel 1 can be formed by successively overlaying a TAC (triacetyl cellulose) film having no birefringence and a stretched PVA film having a phase difference function on the support base 2c with a bond interposed therebetween, by eliminating the phase difference function in a portion other than a portion where a resist is coated in a linear shape, thus alternately forming the right-eye image display portion 2a and the left-eye image display portion 2b, and by disposing a protective material film having no birefringence on the side where the resist is coated. The thus-obtained phase difference element is bonded to the image display panel 1. As still another example, the phase difference element 2 may be formed by uniaxially orienting a liquid crystal polymer layer on the support base 2c.

The light shield layer 3 is formed only in an area including the boundary between the right-eye image display portion 2a and the left-eye image display portion 2b of the phase difference element 2 so as to project from the surface of the phase difference element 2 toward the image display panel 1 for the purpose of preventing generation of the crosstalk phenomenon. In more detail, for example, when the right-eye image display portion 2a and the left-eye image display portion 2b are alternately arranged per horizontal line, a stripe-shaped light shield layer is arranged to position only in an area with a predetermined width, which includes the boundary between both the display portions 2a and 2b. The light shield layer 3 can be formed, for example, by arranging a black material, e.g., a carbon material, having a function of shielding the light so as to project on the surface of the phase difference element 2 with a projection height of about 10 to 15 μm, for example.

The binder layer 4 is interposed between the image display panel 1 and the phase difference element 2, more exactly speaking, between the image display panel 1 and the surface of the phase difference element 2 on which each light shield layer 3 is formed, except for a portion between a top surface of the light shield layer 3 and the image display panel 1, in order to effectuate bonding therebetween. It is here assumed that, because the portion between the top surface of the light shield layer 3 and the image display panel 1 is excluded as described above, the binder layer 4 is not present in that portion.

Herein, the term "binder layer" implies a layer formed of a binder. The term "binder" implies a material interposed between two members for bonding, specifically a bond or an adhesive material. Therefore, the "binder layer" includes a layer formed of the bond and a layer formed of the adhesive material.

In the stereoscopic image display apparatus according to this embodiment, for the reasons described later, the binder layer 4 is made of an acrylic adhesive material in transparent gel-like form and has a layer thickness of 25 to 100 μm. Further, the adhesive material has hardness in the range of larger than 0 and not larger than 350000 μN and an after-bonding retention force of 8 to 20 N/20 mm at 40° C.

The term "adhesive material" implies a semi-solid material which has a low coefficient of elasticity and high viscosity from the beginning, and which does not change in form even after the bonding, i.e., which does not necessitate a solidifying step.

The air layer 5 is formed between the top surface of the light shield layer 3 and the image display panel 1 because the binder layer 4 is not present there. In other words, the air layer 5 is formed by a space not filled with the binder layer 4.

The antireflective film 6 is arranged so as to cover an image output surface of the phase difference element 2, thus preventing reflection of light at the image output surface and increasing light transmissivity.

The binder layer 7 serves to bond the antireflective film 6 to the phase difference element 2 (more exactly speaking, the support base 2c of the phase difference element 2). The binder layer 7 can be made of a layer of, e.g., a bond or an adhesive material.

In the stereoscopic image display apparatus having the above-described construction, the phase difference element 2 for producing a stereoscopic image is disposed on the polarizing plate 1b on the surface of the liquid crystal panel 1a, which is positioned on the side to face the viewing person, with the binder layer 4 disposed between the phase difference element 2 and the polarizing plate 1b. The phase difference element 2 has the right-eye image display portion 2a corresponding to the image for the right eye and the left-eye image display portion 2b corresponding to the image for the left eye, thus providing the polarization states different from each other.

Accordingly, when the viewing person puts on the polarization spectacles of which right- and left-eye spectacles have different angles of polarization adapted for the corresponding images, the image for the right eye and the image for the left eye enter the right eye and the left eye of the viewing person independently of each other. As a result, the viewing person can see a stereoscopic image.

Further, because of the light shield layer 3 being disposed between the image display panel 1 and the phase difference element 2 corresponding to the boundary between the right-eye image display portion 2a and the left-eye image display portion 2b, even when the viewing person looks at the image display panel in an oblique direction, for example, the light shield layer 3 shields the light in such a way that the image for the right eye does not pass through the left-eye image display portion 2b and the image for the left eye does not pass through the right-eye image display portion 2a. Thus, generation of the crosstalk phenomenon can be prevented.

[Method of Manufacturing Stereoscopic Image Display Apparatus]

The method of manufacturing the stereoscopic image display apparatus having the above-described construction will be described below.

The method of manufacturing the stereoscopic image display apparatus includes at least an annealing step, a light-shield layer forming step, a positioning step, and a bonding step.

Those steps will be described one by one below.

[Annealing Step]

The stereoscopic image display apparatus includes the phase difference element 2 as described above, but the phase difference element 2 is made of a material containing water by nature and has a characteristic of adsorbing moisture in air. Therefore, if the phase difference element 2 is bonded while it remains in such a condition and if the front and rear surfaces of the phase difference element 2 are sealed off by sandwiching it with light transmissive materials having no air-permeability, e.g., glass substrates, to construct the stereoscopic image display apparatus, the following problem may occur.

For example, when the stereoscopic image display apparatus is shipped out as a product from a production factory, it is often transported by sea crossing the equator. In that case, the ambient temperature of the product may reach a range of 60 to 70° C. If the product is left under such a high-temperature environment for a certain time or longer, water or gas, e.g., acetic acid, may emanate from the phase difference element 2 to generate bubbles with sizes of about 50 to 200 μm. In that situation, if the front and rear surfaces of the phase difference element 2 are in the sealed-off state, the bubbles lose the way to escape, thus resulting in a risk that the stereoscopic image display apparatus may become failed.

In manufacturing the stereoscopic image display apparatus, therefore, an annealing step is carried out on the phase difference element 2 prior to bonding the phase difference element 2.

In the annealing step, the phase difference element 2 is subjected to heat treatment in a state where at least one surface of the phase difference element 2, specifically the surface of the phase difference element 2 on which the right-eye image display portion 2a and the left-eye image display portion 2b are formed, is not sealed off and is released to the atmospheric environment.

The heat treatment is performed at a predetermined temperature for a predetermined time. Concretely, taking into account that the heat-resistant temperature of the phase difference element 2 is about 100 to 120° C., the heat treatment is performed at temperature of, e.g., 40 to 80° C., preferably at a temperature of about 70° C., for a period of not shorter than 1 hour and not longer than three days, preferably about 48 hours.

Other conditions in the heat treatment than those described above can be set based on the techniques practiced in the related art.

By carrying out the annealing step with the above-described heat treatment, even if the product is thereafter left under the high-temperature environment for the certain time or longer, it is possible to suppress generation of bubbles from the phase difference element 2, which may cause a product failure.

More specifically, experiments have been conducted on a stereoscopic image display apparatus obtained through the annealing step including the heat treatment at 70° C. for 24 hours and a stereoscopic image display apparatus obtained without the annealing step by leaving both the completed apparatuses in an environment of 70° C. for 48 hours and by counting visually recognizable bubbles within an area of 14 cm×35 cm in the panel. As a result, it has been confirmed that the number of bubbles in the stereoscopic image display apparatus without the annealing step is 61, while the number of bubbles in the stereoscopic image display apparatus with the annealing step is 2.

Thus, the annealing step can drastically reduce the number of bubbles which are generated from the phase difference element 2 and which may cause a failed product.

[Light Shield Layer Forming Step]

As described above, the stereoscopic image display apparatus includes the light shield layer 3. In the process of manufacturing the stereoscopic image display apparatus, therefore, a light shield layer forming step is carried out to form the light shield layer 3.

Figure 2A:
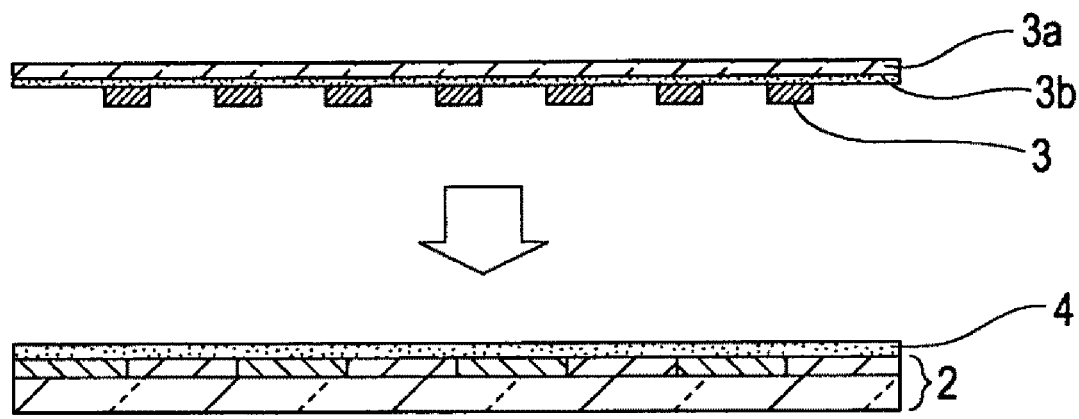
FIGS. 2A and 2B are explanatory views illustrating, by way of example, primary points of a light shield layer forming step in a method of manufacturing the stereoscopic image display apparatus according to the embodiment of the present invention.
Figure 2B:
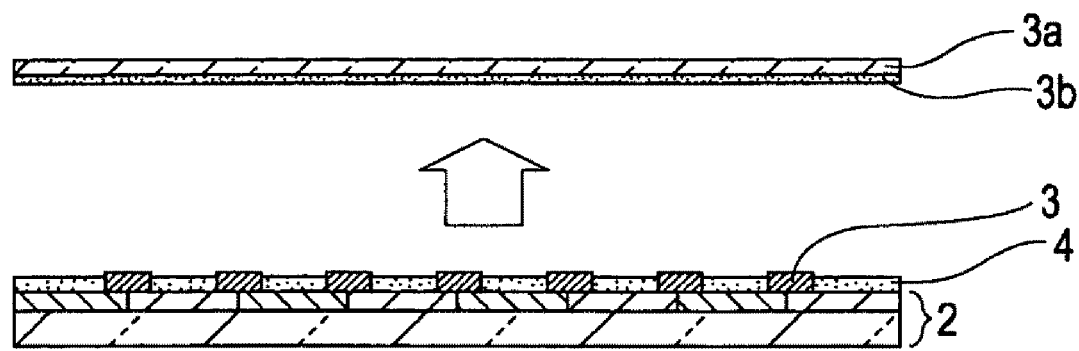

FIGS. 2A and 2B are explanatory views illustrating, by way of example, primary points of the light shield layer forming step.

In the light shield layer forming step, as illustrated in FIGS. 2A and 2B, the light shield layer 3 formed on a base sheet 3a in a state strippable therefrom can be transferred onto the surface of the phase difference element 2 from the base sheet 3a such that the light shield layer 3 projects from the surface of the phase difference element 2.

More specifically, as illustrated in FIG. 2A, the binder layer 4 is first formed in uniform thickness on the surface of the phase difference element 2 on which the light shield layer 3 is to be formed (i.e., the surface of the phase difference element 2 on which the right-eye image display portion 2a and the left-eye image display portion 2b are formed).

On the other hand, the light shield layer 3 is formed on the surface of the base sheet 3a, which is made of, e.g., TAC film, with an adhesive layer 3b interposed therebetween for fixing the light shield layer 3 to the sheet surface in a strippable manner. At that time, the adhesion force of the adhesive layer 3b is set to be smaller than that of the binder layer 4. Because the light shield layer 3 can be formed by using the technique practiced in the related art, e.g., photolithography, a method of forming the light shield layer 3 is not described here.

After forming the binder layer 4 on the phase difference element 2 and forming the light shield layer 3 on the base sheet 3a with the adhesive layer 3b interposed therebetween, those two members are bonded to each other in a state of the light shield layer 3 being positioned to face the binder layer 4. At that time, a resulting laminate is pressed from both sides such that the light shield layer 3 comes into the binder layer 4.

After the bonding, the base sheet 3a is stripped off as illustrated in FIG. 2B. Herein, the adhesion force of the adhesive layer 3b disposed on the base sheet 3a is set to be smaller than that of the binder layer 4. As a result of stripping off the base sheet 3a, therefore, the light shield layer 3 formed on the base sheet 3a is transferred from the base sheet 3a onto the phase difference element 2. In other words, the light shield layer 3 is fixed onto the surface of the phase difference element 2 by the adhesion force of the binder layer 4.

By transferring the light shield layer 3 onto the phase difference element 2 as described above, the light shield layer 3 is arranged so as to project on the surface of the phase difference element 2 at a position corresponding to the boundary between the right-eye image display portion 2a and the left-eye image display portion 2b. Further, a portion not including the projecting light shield layer 3 and providing a light transmissive area is coated with the binder layer 4 so as to fill a recess formed by two adjacent light shield layers 3. Additionally, the top surface of the light shield layer 3 projecting on the surface of the phase difference element 2 (i.e., the top surface of a projection formed by the light shield layer 3) is in a state where the binder layer 4 is not present and the adhesive layer 3b is also not left because it has been peeled off together with the stripping of the base sheet 3a.

By carrying out the light shield layer forming step through the above-described procedures, the light shield layer 3 formed on the base sheet 3a in a strippable manner can be transferred from the base sheet 3a onto the surface of the phase difference element 2 so that the light shield layer 3 projects on the surface of the phase difference element 2. Accordingly, the light shield layer 3 can be more easily formed than the case of directly forming the light shield layer 3 on the surface of the phase difference element 2.

While the light shield layer forming step has been described above, by way of example, as transferring the light shield layer 3 from the base sheet 3a, the light shield layer 3 may also be directly formed so as to project on the surface of the phase difference element 2 by using the technique practiced in the related art, e.g., photolithography.

[Positioning Step]

In constructing the stereoscopic image display apparatus, precise positioning is necessitated for relative relationships among the image display panel 1, the phase difference element 2, and the light shield layer 3.

One reason is that, for example, if precise positioning is not performed between the image display panel 1 and the phase difference element 2, the right-eye image display portion 2a corresponding to the image for the right eye and the left-eye image display portion 2b corresponding to the image for the left eye may deviate from their proper positions, thus causing disadvantages that an image looked at by the viewing person becomes unclear and a stereoscopic effect is reduced. Concretely, when a HD (High-Definition) signal for, e.g., an image display panel of 40-inch class is displayed, a one-pixel line is provided as a very thin line with a vertical width of about 500 μm. Assuming the allowable range of a positional deviation to be less than 5%, therefore, it is necessary that the positioning step is performed at a level of 25 μm.

Another reason is that, for example, if precise positioning is not performed between the phase difference element 2 and the light shield layer 3, the position where the light shield layer 3 is arranged may deviate from the boundary between the right-eye image display portion 2a and the left-eye image display portion 2b, thus causing disadvantages that the generation of the crosstalk phenomenon is not prevented and brightness of a displayed image is reduced due to reduction in quantity of the light passing through the image display panel.

To avoid those disadvantages, in manufacturing the stereoscopic image display apparatus, the positioning step is carried out for planar relative positioning among the image display panel 1, the phase difference element 2, and the light shield layer 3 before the phase difference element 2 and the light shield layer 3 are bonded to the image display panel 1.

Figure 3:
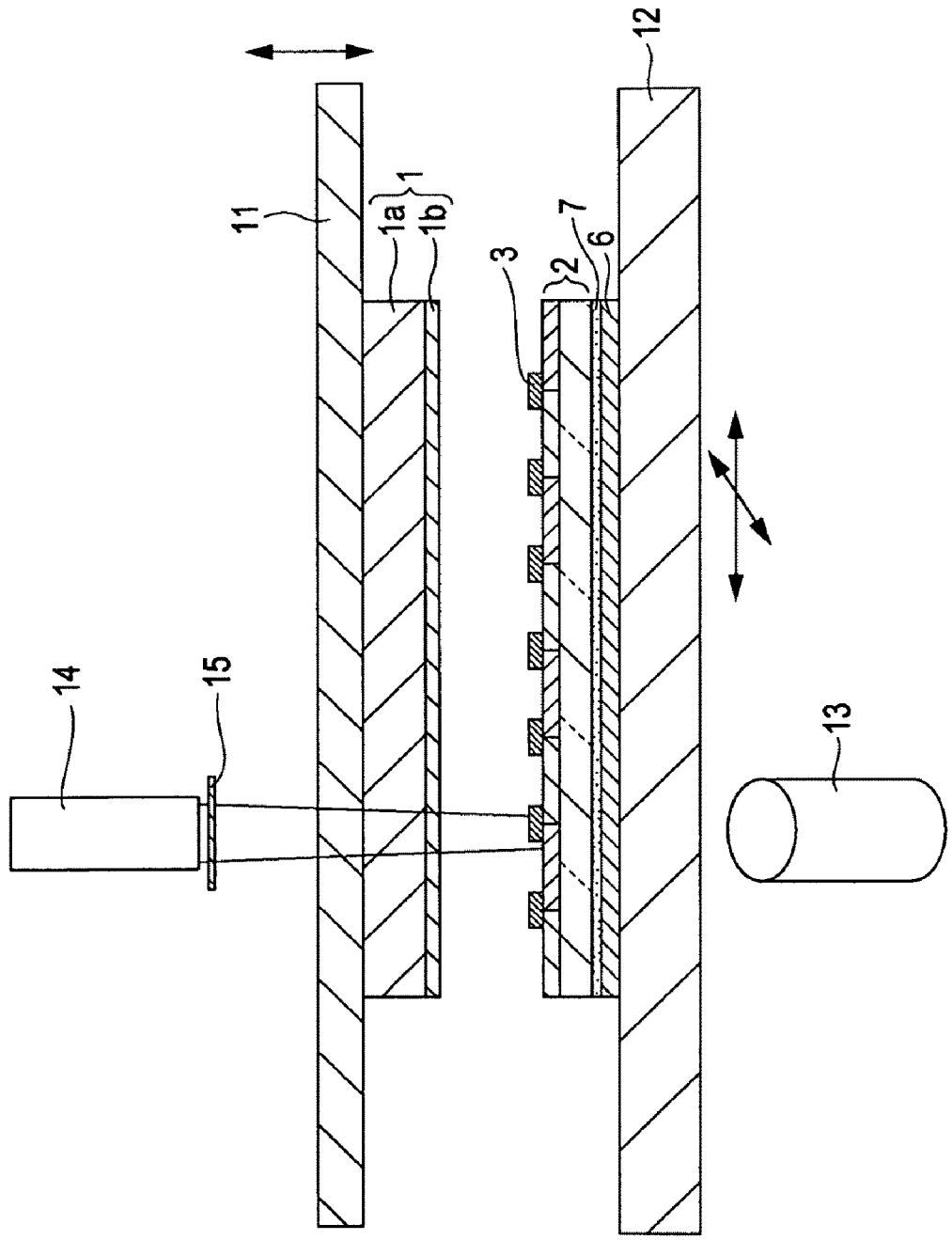
FIG. 3 is an explanatory view illustrating, by way of example, primary points of a positioning step in the method of manufacturing the stereoscopic image display apparatus according to the embodiment of the present invention.

FIG. 3 is an explanatory view illustrating primary points of the positioning step.

FIG. 3 represents, by way of example, the case where planar positioning is performed between the image display panel 1, including the liquid crystal panel 1a and the polarizing plate 1b, and a laminate including the phase difference element 2, the light shield layer 3, the antireflective film 6, and the binder layer 7. In addition to the case illustrated in FIG. 3, the planar positioning can also be applied to positioning between the phase difference element 2 and the base sheet 3a, including the light shield layer 3, in exactly the same manner.

In performing the planar positioning in the case illustrated in FIG. 3, the image display panel 1 is supported on an upper stage 11 of a positioning apparatus and the laminate including the phase difference element 2, etc. is supported on a lower stage 12 of the positioning apparatus. The image display panel 1 and the laminate are positioned to face each other. The image display panel 1 and the laminate can be supported on the upper stage 11 and the lower stage 12, respectively, by utilizing the technique practiced in the related art, such as vacuum adsorption. At least one of the upper stage 11 and the lower stage 12 has a structure capable of sliding in the direction perpendicular to the drawing sheet and the right-to-left direction as viewed in FIG. 3, or in the up-and-down direction as viewed in FIG. 3.

In the positioning apparatus, an image pickup device 13, such as an image processing camera, for position detection is disposed on the outer side of one of the upper stage 11 and the lower stage 12. Further, a light source 14 for irradiating light is disposed on the side opposite to the image pickup device 13 with the upper stage 11 and the lower stage 12 interposed therebetween. The light source 14 is associated with a polarizing plate 15 which provides a polarization state corresponding to one of the right-eye image display portion 2a and the left-eye image display portion 2b of the phase difference element 2.

The positioning apparatus may include a focal depth changing mechanism for two focuses to provide a positioning mechanism, which enables optimum positioning to be performed with respect to a marking line added to an image output from the image pickup device 13 while a gap is left between the phase difference element 2 and the laminate.

In the positioning apparatus thus constructed, when performing the planar positioning for the phase difference element 2, specifically the planar positioning between the laminate, including the phase difference element 2 and the light shield layer 3, and the liquid crystal panel 1a, the irradiation light from the light source 14 is introduced so as to reach the phase difference element 2 through the polarizing plate 15 disposed between the light source 14 and the laminate. The light having passed through the phase difference element 2 is detected by the image pickup device 13. At that time, the irradiation light from the light source 14 is polarized by the polarizing plate 15. Therefore, the irradiation light from the light source 14 passes through one of the right-eye image display portion 2a and the left-eye image display portion 2b and reaches the image pickup device 13, whereas the irradiation light does not pass through the other image display portion and is blocked. Accordingly, the boundary between the right-eye image display portion 2a and the left-eye image display portion 2b of the phase difference element 2 can be clearly recognized based on an image detected by the image pickup device 13.

When the liquid crystal panel 1a of the image display panel 1 is of the so-called normally black type, it is difficult to make light pass through the liquid crystal panel 1a in a state not applied with a voltage even if the light is irradiated to the liquid crystal panel 1a from one side thereof in quantity comparable to that of backlight. Also, it is not practically realistic to apply a voltage to the liquid crystal panel 1a for the purpose of positioning.

For those reasons, in the positioning apparatus, when performing the planar positioning for the image display panel 1, specifically the planar positioning between the liquid crystal panel 1a of the image display panel 1 and the laminate including the phase difference element 2, the light shield layer 3, etc., the irradiation light is emitted from the light source 14 in quantity enough to pass through the liquid crystal panel 1a even when the liquid crystal panel 1a of the normally black type is in the state not applied with a voltage, i.e., even when the liquid crystal panel 1a is in a state where light transmissivity thereof is minimum. Concretely, the irradiation light is emitted from the light source 14 in minimum quantity of, e.g., 30,000 lux or more. On the other hand, it is desired that a maximum quantity of the irradiation light is set to such a value as not adversely affecting liquid crystal molecules, etc. in the liquid crystal panel 1a.

By emitting the irradiation light in such a quantity from the light source 14, even when the liquid crystal panel 1a is of the normally black type, the irradiation light can be caused to pass through the liquid crystal panel 1a and to reach the image pickup device 13 without applying a voltage to the liquid crystal panel 1a. Accordingly, a portion where the light passes through, such as a pixel area, and a portion covered with the light shield layer 3, such as a wiring area, can be distinguished from each other based on an image detected by the image pickup device 13. Thus, the planar precise position of the image display panel 1 including the liquid crystal panel 1a can be clearly recognized.

With the positioning step described above, a variation in accuracy of positioning between the image display panel 1 and the laminate including the phase difference element 2, etc. can be reduced to about 25 μm in comparison with 50 to 60 μm in the related art.

[Bonding Step]

After carrying out the planar positioning between the image display panel 1 and the laminate including the phase difference element 2, etc., a bonding step of bonding them to each other is successively carried out while the precisely positioned state is kept.

The bonding between the image display panel 1 and the laminate including the phase difference element 2, etc. is performed by interposing the binder layer 4 therebetween. On that occasion, however, the binder layer 4 is interposed in an area between the image display panel 1 and the surface of the phase difference element 2, on which the light shield layer 3 is formed, except for a portion between the top surface of the light shield layer 3 and the image display panel 1.

More specifically, the above-mentioned area except for the portion between the top surface of the light shield layer 3 and the image display panel 1, i.e., a portion of the surface of the phase difference element 2 which does not include the light shield layer 3 projecting thereon and which provides a light transmissive area, is coated with the binder layer 4 so as to fill a recess formed by two adjacent light shield layers 3 such that the binder layer 4 is formed there.

On the other hand, the binder layer 4 is not interposed between the top surface of the light shield layer 3 and the image display panel 1. As a result, after bonding the image display panel 1 and the laminate including the phase difference element 2, etc. to each other, the air layer 5 not filled with the binder layer 4 is formed between the image display panel 1 and the top surface of the light shield layer 3.

The binder layer 4 filled in the above-mentioned area except for the portion between the top surface of the light shield layer 3 and the image display panel 1 desirably satisfies the conditions described below.

The binder layer 4 is located in the light transmissive area. Accordingly, the binder layer 4 is made of a material not adversely affecting optical characteristics between the image display panel 1 and the phase difference element 2 after the bonding. For that reason, an acrylic adhesive material being light transmissive and in transparent gel-like form is used to form the binder layer 4.

If the thickness of the binder layer 4 is too small, a difficulty arises in ensuring uniformity of the binder layer 4. Also, when the bonded surface of the image display panel 1 or the phase difference element 2 has, e.g., undulations and lacks planar uniformity, it is difficult for the binder layer 4 to absorb the undulations if the binder layer 4 is too thin. Further, taking into account that the light shield layer 3 is formed by, e.g., transfer in the light shield layer forming step, the binder layer 4 desirably has a thickness at least exceeding the projection height of the light shield layer 3. On the other hand, if the thickness of the binder layer 4 is too large, risks may occur in adversely affecting the optical characteristics, such as reduction of light transmissivity, and in increasing a possibility that foreign matters, such as bubbles, are mixed in the binder layer 4.

For those reasons, the binder layer 4 is formed in thickness of 25 to 100 μm.

If the hardness of the adhesive material used to form the binder layer 4 is too high, this leads to unsatisfactory results, for example, in impeding the function of the binder layer 4 serving as a cushion between the image display panel 1 and the phase difference element 2, and the function of the binder layer 4 to fill the recess formed by two adjacent light shield layers 3.

Further, if the retention force of the binder layer 4 after the bonding is too small, it is difficult to keep the planar positioning between the image display panel 1 and the phase difference element 2 in the desired state. On the other hand, if the retention force of the binder layer 4 after the bonding is too large, this is also disadvantageous in that in the event of a failure, for example, it is very difficult to peel off the image display panel 1 in the region bonded by the binder layer 4 and to bond it again.

For those reasons, the hardness and the after-bonding retention force of the adhesive material, which is used to form the binder layer 4, are set as described below.

Figure 4A:
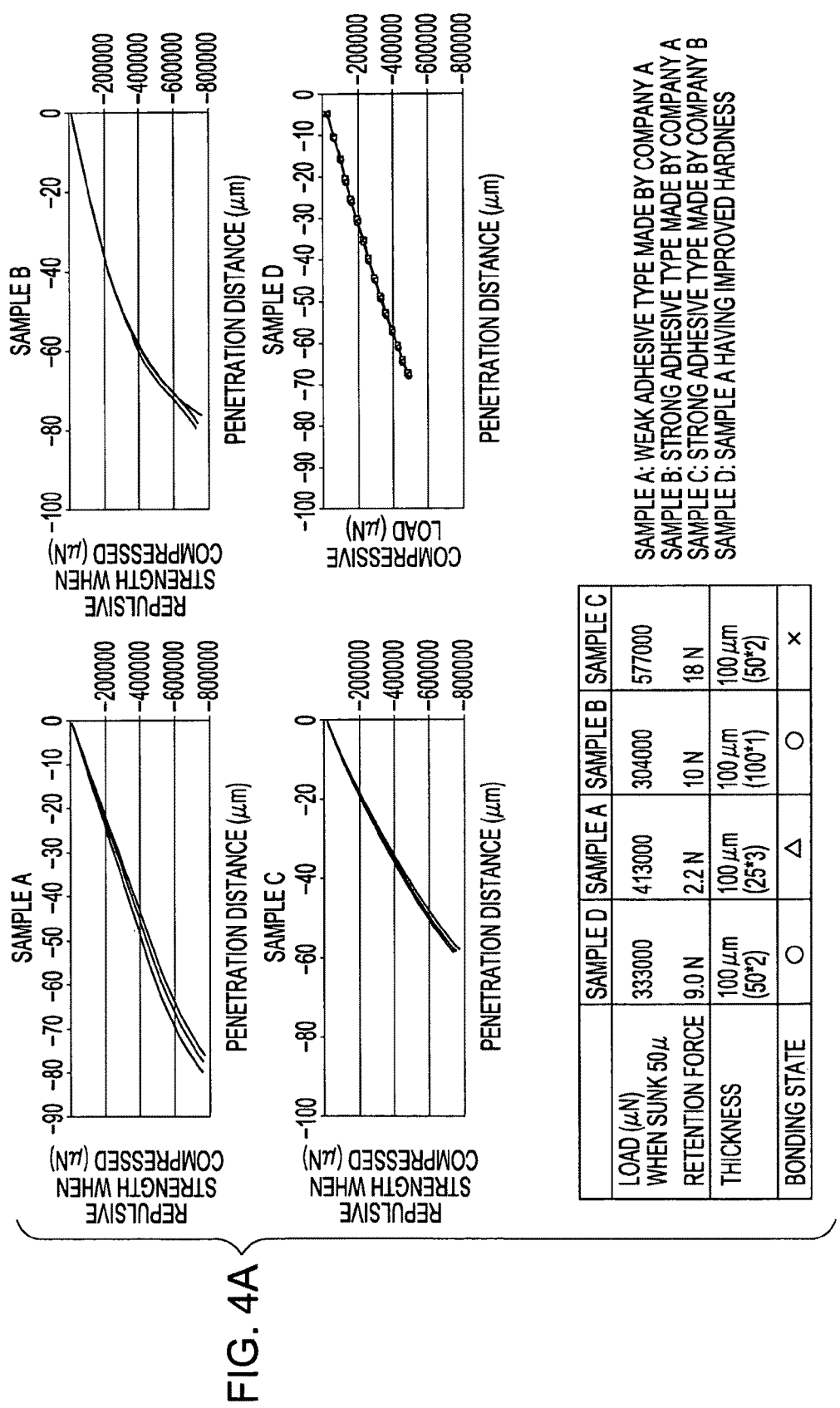
FIGS. 4A, 4B and 4C are explanatory views showing, by way of example, hardness and a retention force of an adhesive material used to form a binder layer in the stereoscopic image display apparatus according to the embodiment of the present invention, as well as illustrating manners for measuring those parameters.
Figure 4B:
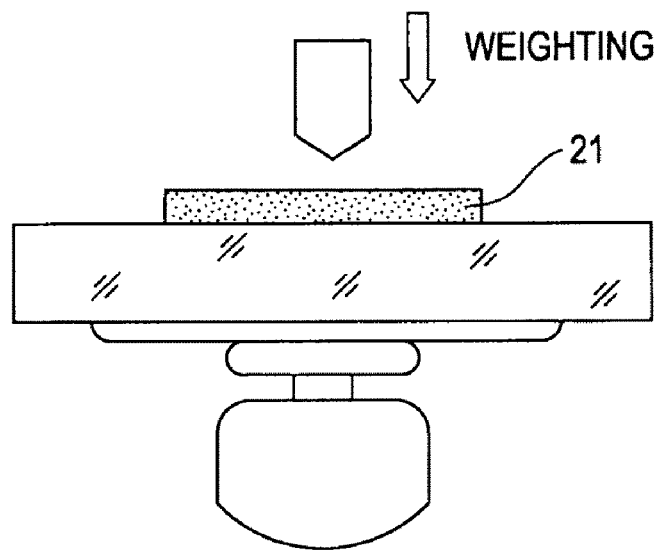
Figure 4C:
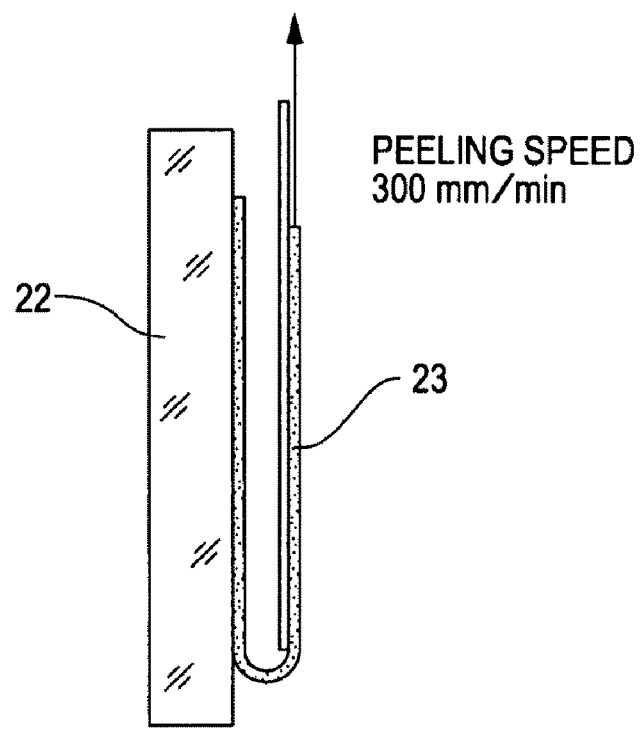

FIGS. 4A, 4B and 4C are explanatory views showing, by way of example, the hardness and the retention force of the adhesive material (layer), as well as illustrating manners for measuring those parameters.

FIG. 4A shows the results of measuring several types of adhesive material layers each having a thickness of 100 μm for studying the hardness and the retention force of the adhesive material in a comparative manner.

The hardness of the adhesive material is determined by measuring, as an index, repulsive strength when the adhesive material layer is compressed (specifically when an adhesive material (sample) 21 having a thickness of 100 μm is sunk, e.g., 50 μm), as illustrated in FIG. 4B.

The retention force (bonding strength) of the adhesive material is determined by measuring, as an index, peel strength when an adhesive material (sample) 23 having a width of 20 mm is coated on a glass plate 22 and then peeled off as illustrated in FIG. 4C.

As seen from FIG. 4A, the results of actually measuring and studying the hardness and the retention force of each adhesive material under the above-described conditions in a comparative manner indicate that, by setting the hardness of the adhesive material to be not higher than 350000 μN and the retention force of the adhesive material after the bonding to be 8 to 20 N/20 mm at 40° C., the precisely positioned state can be maintained without generating bubbles, peels, etc. and without causing a problem in external appearance over the entire bonded region.

Accordingly, the adhesive material used to form the binder layer 4 is selected such that the hardness of the adhesive material is set in the range of higher than 0 and not higher than 350000 μN and the retention force of the adhesive material after the bonding is set in the range of 8 to 20 N/20 mm at 40° C.

By interposing the binder layer 4 satisfying the above-described conditions in the area between the image display panel 1 and the surface of the phase difference element 2 except for the portion between the top surface of the light shield layer 3 and the image display panel 1, and then by bonding the image display panel 1 and the laminate, including the phase difference element 2 and the light shield layer 3, to each other, the above-mentioned area except for the portion between the top surface of the light shield layer 3 and the image display panel 1 (i.e., the recessed surface of the phase difference element 2 where the projecting light shield layer 3 is not formed) is coated with the binder layer 4 such that the binder layer 4 is filled and formed there. In other words, even with projections and recesses formed on the surface of the phase difference element 2 by the light shield layers 3, the recesses where the light shield layers 3 are not formed, i.e., the light transmissive areas, are each filled with the binder layer 4 in a way following the shape of the recess, and an air layer is prevented from being generated due to the absence of the binder layer 4. As a result, the image display panel 1 and the phase difference element 2 can be bonded to each other such that, in spite of the light shield layers 3 providing the projections and the recesses, an air layer possibly causing deterioration in quality of the displayed image is prevented from being generated in the recesses corresponding to the light transmissive areas.

On the other hand, the air layer 5, i.e., a space not filled with the binder layer 4, is present between the top surface of the light shield layer 3 and the image display panel 1. Accordingly, even when a bonded surface with respect to the image display panel 1, i.e., a flat plane formed by the respective top surfaces of the light shield layers 3, has undulations due to the projections and the recesses formed by the light shield layers 3, the air layer 5 acts to escape distortions that may occur in the bonding step. As a result, unevenness of the bonding-stress in-plane distribution state after the bonding is reduced. Further, the position at which the air layer 5 is present corresponds to a position between the top surface of the light shield layer 3 and the image display panel 1, i.e., a position at which light is blocked by the light shield layer 3. Therefore, the presence of the air layer 5 does not deteriorate the quality of the displayed image unlike the case that the air layer is present in the recess where the light shield layer 3 is not formed.

The binder layer 4 interposed in the area between the image display panel 1 and the surface of the phase difference element 2 except for the portion between the top surface of the light shield layer 3 and the image display panel 1 may also be formed by using some other suitable adhesive material or bond than the above-described adhesive material so long as it can be coated so as to fill the recesses formed by the light shield layers 3 and can form the air layer 5 between the top surface of the light shield layer 3 and the image display panel 1.

When bonding the image display panel 1 and the laminate, including the phase difference element 2, the light shield layer 3, etc. to each other, as the panel size increases, a possibility of entraining small bubbles, etc. in the bonding step also increases. Further, as the panel size increases, it is more difficult to maintain high surface accuracy of each of the image display panel 1, the phase difference element 2, and the top surface of the light shield layer 3. This increases a possibility that planar uniformity may be impaired due to, e.g., undulations generated in the bonded surface thereof, and also causes a risk that a local gap may be generated and the adhesion and the spacing distance therebetween become uneven.

For those reasons, the image display panel 1 and the laminate, including the phase difference element 2, the light shield layer 3, etc., are bonded to each other while pressure is applied by using a bonding roller.

Figure 5A:
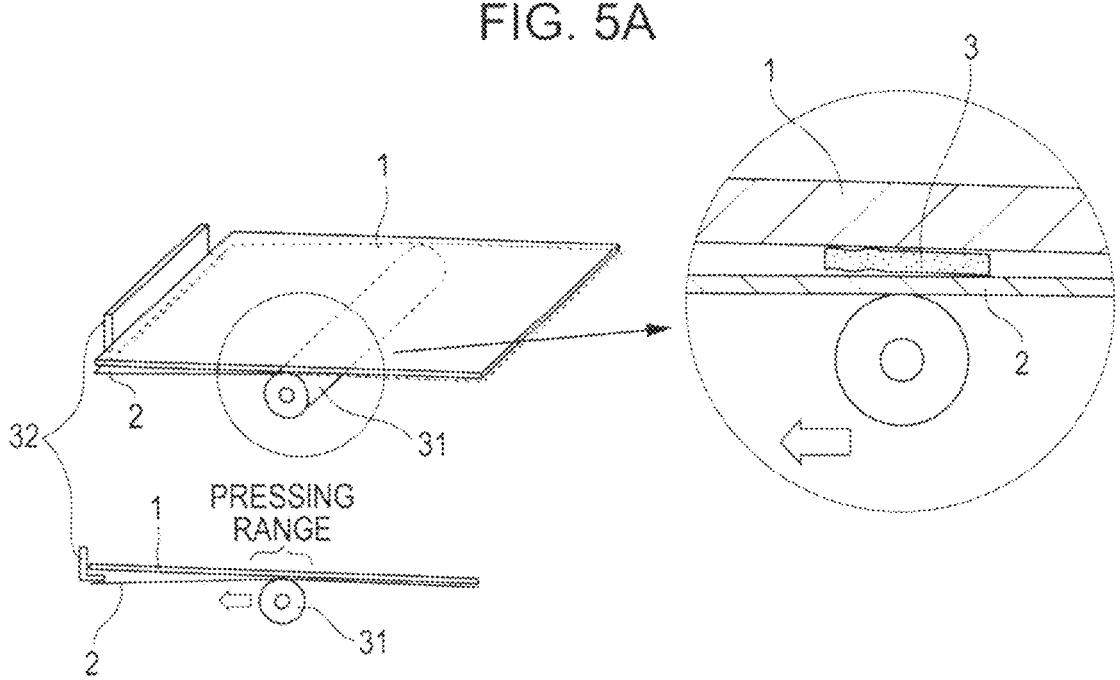
FIGS. 5A and 5B are explanatory views illustrating, by way of example, a bonding step in the method of manufacturing the stereoscopic image display apparatus according to the embodiment of the present invention, and illustrating a concrete example of pressure bonding using a bonding roller.

FIG. 5A is an explanatory view illustrating one concrete example of pressure bonding using the bonding roller.

When bonding the image display panel 1 and the laminate, including the phase difference element 2, the light shield layer 3, etc. to each other, as illustrated in FIG. 5A, in a state where the binder layer 4 is interposed therebetween, a bonding roller 31 is caused to run from one end toward the other end (as indicated by an arrow in FIG. 5A) of a to-be-bonded laminate including the image display panel 1, the binder layer 4, the light shield layer 3, the phase difference element 2, etc., while pressure is applied to the laminate from above and below in a direction in which respective layers of the laminate are overlaid one above another.

At that time, the bonding roller 31 is operated to press against the laminate by a force within a predetermined range and to run at a speed within a predetermined range.

Figure 5B:
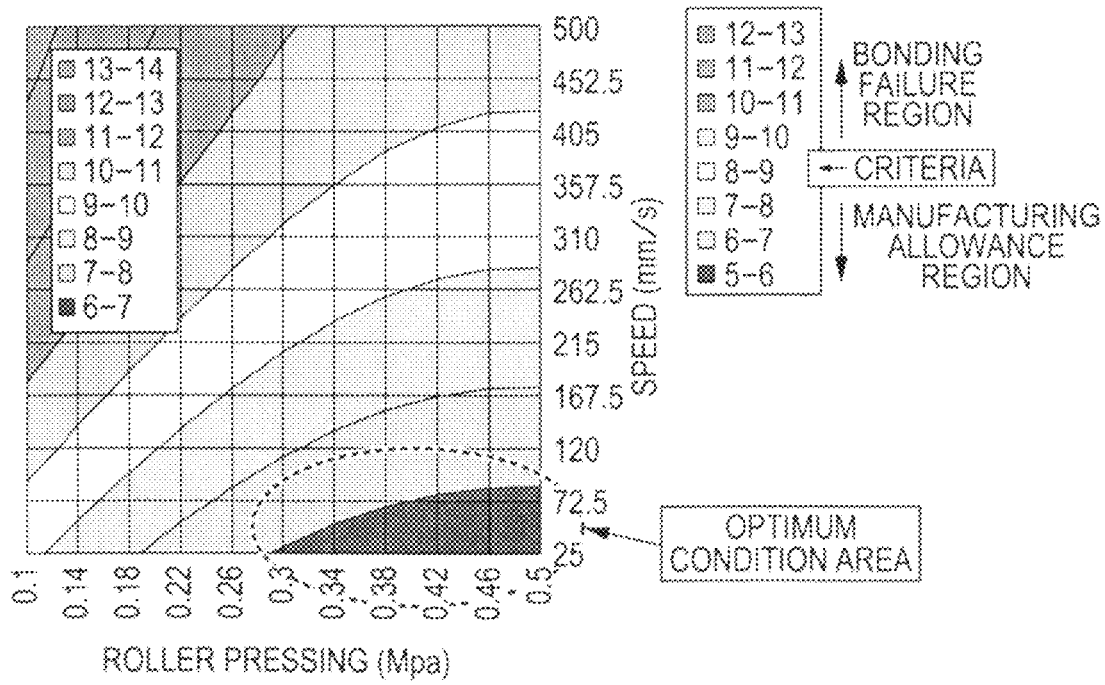
Figure 6:
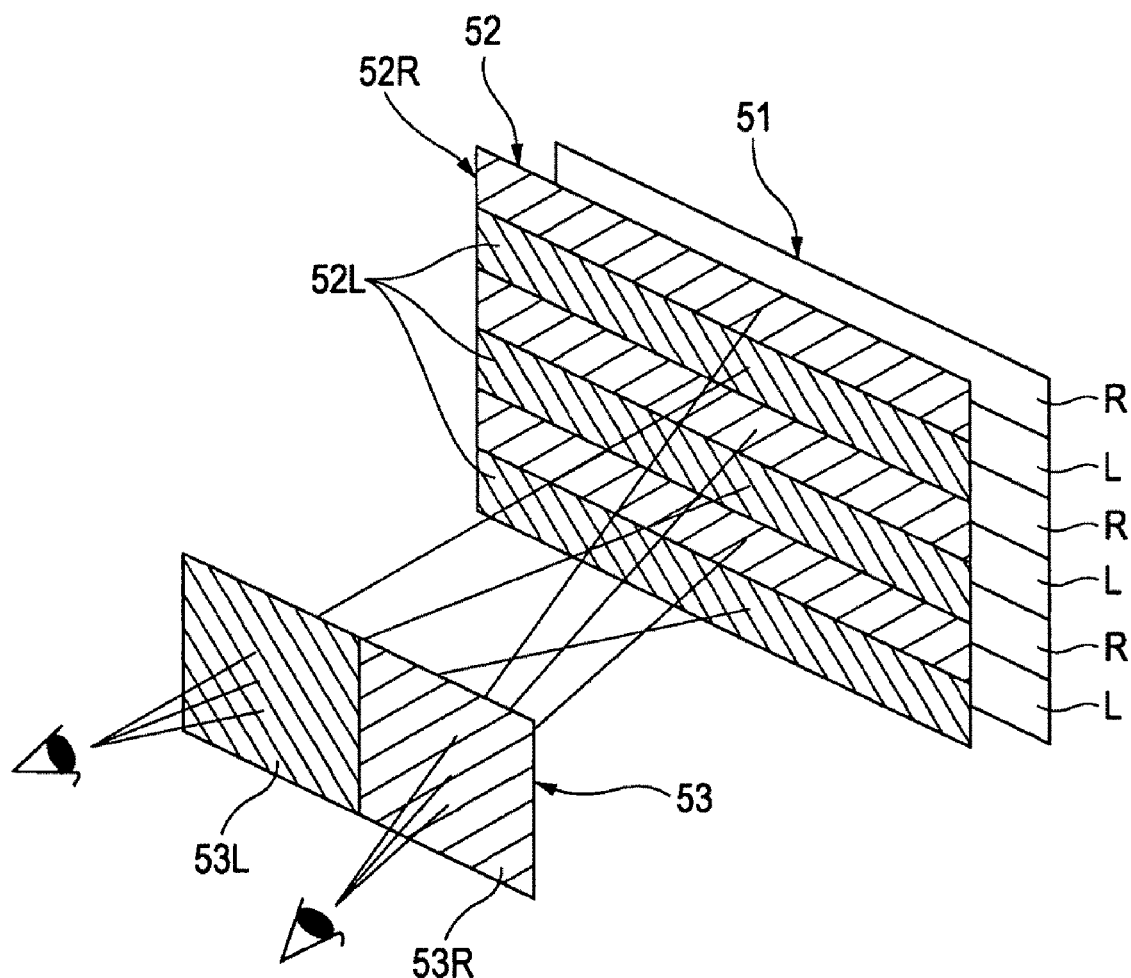
FIG. 6 is an explanatory view illustrating an example of basic construction, in a simplified form, of a stereoscopic image display apparatus of the related art.

Concretely, as illustrated in FIG. 5B, the bonding roller 31 is pressed by a pressing force falling within an optimum condition area and is run at a speed falling within the optimum condition area. The reason is that, if the pressing force is too small or if the running speed is too fast, a possibility of entraining bubbles, etc. increases.

The optimum condition area can be derived in accordance with empirical rules, such as based on experiments. FIG. 5B represents the relationship between the pressing force and the running speed of the bonding roller 31 when the vertical position (clearance) of a support 32 (described later) is set to 0.4 mm. The vertical position of the support 32 is optionally adjusted depending on, e.g., the thickness and the size of the phase difference element 2 to be bonded. As a matter of course, the relationship between the pressing force and the running speed differs depending on the vertical position of the support 32.

Further, in the pressure bonding using the bonding roller 31, the end position of the phase difference element 2 is held such that a gap is left between the phase difference element 2 and the image display panel 1 on the side closer to the other end of the laminate toward which the bonding roller 31 runs away from the bonding position by the bonding roller 31.

Concretely, as illustrated in FIG. 5A, the end position of the phase difference element 2 is supported by the support 32 so as to leave a gap between the image display panel 1 and the phase difference element 2. Further, the end position of the phase difference element 2 is moved in conjunction with the running of the bonding roller 31. More specifically, the position of the support 32 is moved such that, as the bonding roller 31 approaches the support 32, the gap between the image display panel 1 and the phase difference element 2 reduces.

A mechanism, etc. for running the bonding roller 31 and moving the support 32 in a cooperated manner can be realized by using the technique practiced in the related art, and hence a detailed description of such a mechanism is omitted.

Stated another way, the pressure bonding using the bonding roller 31 is performed by moving the vertical position of the support 32, which holds the end of the phase difference element 2, in conjunction with the running speed of the bonding roller 31 such that pressure is successively applied to the phase difference element 2 along its length while the phase difference element 2 is kept in a state warped as illustrated. Accordingly, a path allowing bubbles, etc. to escape therethrough is constantly secured on the side toward which the bonding roller 31 runs. Hence, the image display panel 1 and the laminate, including the phase difference element 2, etc., can be bonded to each other in such a way that mixing of fine dust and entrainment of bubbles are minimized.

In addition, the pressing force and the running speed of the bonding roller 31 are optimized from the viewpoint of suppressing the entrainment of bubbles, etc.

Thus, the pressure-bonded laminate including the image display panel 1, the binder layer 4, the phase difference element 2, etc. is obtained with the bonding under the proper and uniform pressing conditions. As a result, even when components of the pressure-bonded laminate include portions in which planarity is poor due to undulations, etc., it is possible to avoid generation of a local gap and to prevent the adhesion and the spacing distance from becoming uneven. Further, even in the case of the panel having a large size, the entrainment of bubbles, etc. can be prevented.

With the above-described bonding step, since the surface of the phase difference element 2, on which the light shield layer 3 is formed, and the image display panel 1 are bonded to each other with the binder layer 4 interposed therebetween except for the portion between the top surface of the light shield layer 3 and the image display panel 1, the binder layer 4 effectuates the bonding over a region of the image display panel 1 including the image display area. Therefore, generation of, e.g., the Moiré phenomenon or the Newton rings (interference fringes), which may cause deterioration in quality of the displayed image, can be avoided substantially as in the case where the image display panel 1 and the phase difference element 2 are bonded to each other by the full-surface bonding.

Moreover, even when the surface of the phase difference element 2 includes the projections and the recesses formed by the light shield layers 3, an air layer is not formed in the recesses where the light shield layers 3 are not present, and deterioration in quality of the displayed image can be avoided which is attributable to the light refractive action by the air layer. In addition, the air layer 5, i.e., a space not filled with the binder layer 4, is present between the top surface of the light shield layer 3 and the image display panel 1, the unevenness of the bonding-stress in-plane distribution state is reduced and deterioration in quality of the displayed image attributable to the unevenness of the stress distribution state can also be suppressed.

Thus, with the above-described bonding step in constructing the stereoscopic image display apparatus, even when the surface of the phase difference element 2 includes the projections and the recesses formed by the light shield layers 3, the deterioration in image quality, which is attributable to the unevenness of the stress in-plane distribution state, can be suppressed with the presence of the necessary air layer 5 while suppressing the deterioration in image quality, which is attributable to the light refractive action with the presence of the undesired air layer. As a result, the phase difference element 2 and the light shield layer 3 can be properly bonded to the image display panel 1.

By using the adhesive material to form the binder layer 4, the cost can be reduced because of the relatively lower cost of the adhesive material itself in comparison with the case of using the bond, for example. Further, since the adhesive material is not solidified like the bond, the binder layer 4 has itself a cushioning action against a load applied from the outside. Therefore, even if the liquid crystal panel 1a is cracked upon application of a load, for example, the glass substrate can be prevented from scattering to the surroundings. This eliminates the necessity of using a protective film or the like which has been used in the related art, and also provides an advantage in reducing the number of parts. Still further, since the adhesive material does not provide such hard-fixed bonding as provided by, e.g., the bond or the UV resin, the pressure-bonded laminate can be peeled off and then bonded again in the event of a failure. As a result, the bonding operation can be more easily performed. Moreover, the use of the adhesive material as the binder layer 4 is expected to more effectively suppress adverse influences upon environments than when a bond containing a volatile solvent, for example, is used.

While the above description is made for a preferred embodiment of the present invention, the present invention is not limited to the above-described embodiment and can be appropriately modified without departing from the gist of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic image display apparatus comprising:
   an image display panel displaying an image for a right eye and an image for a left eye in a regularly mixed manner in a plane;
   a phase difference element including a right-eye image display portion corresponding to the image for the right eye and a left-eye image display portion corresponding to the image for the left eye, the right-eye image display portion and the left-eye image display portion bringing about polarization such that the image for the right eye and the image for the left eye have different polarization states;
   a light shield layer formed only in an area including a boundary between the right-eye image display portion and the left-eye image display portion of the phase difference element, the light shield layer projecting from a surface of the phase difference element toward the image display panel; and
   a binder layer interposed between the surface of the phase difference element on which the light shield layer is formed and the image display panel, except for a portion between a top surface of the light shield layer and the image display panel, thus bonding the image display panel, the phase difference element, and the light shield layer together.

2. The stereoscopic image display apparatus according to claim 1, wherein the light shield layer is fixed onto the surface of the phase difference element by using the binder layer, and
   wherein an air layer is formed between the top surface of the light shield layer and the image display panel.

3. The stereoscopic image display apparatus according to claim 1 or 2, wherein the binder layer is made of an acrylic adhesive material in transparent gel-like form and has a layer thickness of 25 to 100 μm, the adhesive material having hardness in a range of larger than 0 and not larger than 350000 μN and an after-bonding retention force of 8 to 20 N/20 mm at 40° C.

4. A method of manufacturing a stereoscopic image display apparatus, comprising the steps of:
   forming a light shield layer in a projected shape on a surface of a phase difference element including a right-eye image display portion corresponding to an image for a right eye and a left-eye image display portion corresponding to an image for a left eye, the right-eye image display portion and the left-eye image display portion providing different polarization states, the light shield layer being positioned corresponding to only an area including a boundary between the right-eye image display portion and the left-eye image display portion of the phase difference element; and
   bonding the image display panel, the light shield layer, and the phase difference element together with a binder layer interposed between an image display panel displaying an image for a right eye and an image for a left eye in a regularly mixed manner in a plane and the surface of the phase difference element on which the light shield layer is formed, except for a portion between a top surface of the light shield layer and the image display panel.

5. The method of manufacturing the stereoscopic image display apparatus according to claim 4, wherein, in forming the light shield layer, the light shield layer formed on a base sheet in a state strippable therefrom is transferred from the base sheet onto the surface of the phase difference element such that the light shield layer projects on the surface of the phase difference element.

6. The method of manufacturing the stereoscopic image display apparatus according to claim 4, wherein the binder layer used in bonding the image display panel, the light shield layer, and the phase difference element together is made of an acrylic adhesive material in transparent gel-like form and has a layer thickness of 25 to 100 μm, the adhesive material having hardness in a range of larger than 0 and not larger than 350000 μN and an after-bonding retention force of 8 to 20 N/20 mm at 40° C.

7. The method of manufacturing the stereoscopic image display apparatus according to claim 6, wherein in bonding the image display panel, the light shield layer, and the phase difference element together,
   the bonding is performed by running a bonding roller from one end toward the other end of a laminate including the phase difference element, the light shield layer, the binder layer, and the image display panel at a speed falling within a predetermined range, the bonding roller applying a force falling within a predetermined range to the laminate from above and below in a direction in which respective layers of the laminate are overlaid one above another, and during the bonding, the other end of the phase difference element is supported and a position of the other end of the phase difference element is moved in conjunction with the running of the bonding roller such that the phase difference element, the light shield layer, and the binder layer are positioned with a gap left relative to the image display panel on a side nearer to the other end of the phase difference element than the bonding roller.

8. The method of manufacturing the stereoscopic image display apparatus according to claim 7, wherein the method includes, prior to forming the light shield layer, positioning the phase difference element and the light shield layer in planar relation, and wherein in positioning the phase difference element and the light shield layer, the boundary between the right-eye image display portion and the left-eye image display portion of the phase difference element is recognized by introducing irradiation light from a light source, which is disposed on one side of the phase difference element, to enter the phase difference element through a polarizing plate disposed between the light source and the phase difference element, and by detecting the light having passed through the phase difference element by an image pickup device disposed on the other side of the phase difference element.

9. The method of manufacturing the stereoscopic image display apparatus according to claim 7, wherein the method includes, prior to bonding the image display panel, the light shield layer, and the phase difference element together, positioning components of the laminate in planar relation, and wherein in positioning the components of the laminate, planar relative positions of the components of the laminate are recognized by emitting irradiation light from a light source, which is disposed on one side of the laminate, in quantity sufficient to pass through the image display panel even in a state that the image display panel as one component of the laminate has minimum light transmissivity, and by detecting the light having passed through the laminate by an image pickup device disposed on the other side of the laminate.

10. The method of manufacturing the stereoscopic image display apparatus according to claim 7, further comprising, prior to bonding the image display panel, the light shield layer, and the phase difference element together, heat-treating the phase difference element as one component of the laminate for a predetermined time at a predetermined temperature for annealing.

* * * * *